United States Patent [19]
Tanimura et al.

[11] Patent Number: 6,083,464
[45] Date of Patent: Jul. 4, 2000

[54] OZONE SUPPLYING APPARATUS WITH FLUID PURIFICATION AND RECYCLING

[75] Inventors: Yasuhiro Tanimura; Junji Hirotsuji; Shigeki Nakayama; Hisao Amitani; Hiroshi Yuge; Tateki Ozawa, all of Tokyo, Japan

[73] Assignee: Mitsubishi Denki Kabushiki Kaisha, Tokyo, Japan

[21] Appl. No.: 09/111,183

[22] Filed: Jul. 8, 1998

[30] Foreign Application Priority Data

Jul. 24, 1997 [JP] Japan ................................. 9-198439

[51] Int. Cl.[7] ........................................................ C02F 1/78
[52] U.S. Cl. .............................. 422/186.08; 422/186.12; 422/186.14; 422/28
[58] Field of Search .......................... 422/186.08, 186.11, 422/186.12, 186.14, 186.07, 120, 187, 30, 28

[56] References Cited

U.S. PATENT DOCUMENTS

| | | | |
|---|---|---|---|
| 4,430,306 | 2/1984 | Namba et al. | 422/292 |
| 4,453,953 | 6/1984 | Tanaka et al. | 422/112 |
| 4,462,965 | 7/1984 | Azuma et al. | 422/186.08 |
| 4,552,659 | 11/1985 | Tabata et al. | 210/177 |
| 5,368,815 | 11/1994 | Kasting, Jr. et al. | 422/3 |
| 5,409,616 | 4/1995 | Garbutt et al. | 210/760 |
| 5,520,887 | 5/1996 | Shimizu | 422/186.08 |
| 5,520,888 | 5/1996 | Berndt | 422/186.08 |
| 5,656,246 | 8/1997 | Patapoff et al. | 422/187 |

FOREIGN PATENT DOCUMENTS

| | | |
|---|---|---|
| 0 103 144 | 3/1984 | European Pat. Off. . |
| 0 262 449 | 4/1988 | European Pat. Off. . |
| 52-3595 | 1/1977 | Japan . |
| 55-61984 | 5/1980 | Japan . |

OTHER PUBLICATIONS

E. Coleman, et al., Journal of Vacuum Science & Technology, vol. 9, No. 4, pp. 2408–2409, "A Versatile Low–Pressure Ozone Source", Jul. 1, 1991.

*Primary Examiner*—Marian C. Knode
*Assistant Examiner*—Susan Ohorodnik
*Attorney, Agent, or Firm*—Oblon, Spivak, McClelland, Maier & Neustadt, P.C.

[57] ABSTRACT

An ozone supplying apparatus comprising an ozone generator, an adsorption/desorption device for adsorbing and storing ozone from ozonized oxygen, and an ozone desorbing means, the apparatus being arranged to return oxygen to the ozone generator after desorbing ozone therefrom to desorb ozone from the adsorption/desorption device and to perform treatment of an object by mixing the ozone with fluid. The apparatus further includes a fluid storing means for storing fluid after being injected with ozone and a fluid treating means for treating the fluid after treatment of the object.

30 Claims, 8 Drawing Sheets

OZONE SUPPLYING APPARATUS WITH FLUID PURIFICATION AND RECYCLING

BACKGROUND OF THE INVENTION

The present invention relates to an ozone supplying apparatus. More particularly, it relates to an ozone supplying apparatus for producing and storing ozone by using electricity, which is capable of supplying stored ozone at specified ratios to an ozone-consuming object either continuously or intermittently.

There has been conventionally known an intermittent type ozone supplying apparatus for temporarily storing ozone which comprises the following components as shown in FIG. 8: an ozone generator 50, an oxygen supply source 51, a circulating blower 52, an adsorption/desorption tower 53 for temporarily storing generated ozone, a cooling source 54 for cooling the adsorption/desorption tower 53, a heating source 55 for heating the adsorption/desorption tower 53, a water flow ejector 56 for taking ozone out from the adsorption/desorption tower 53 through decompression and suction, a group of switch valves 57a to 57g, and an object 58 to be treated from which living things are removed by liquid containing ozone. The adsorption/desorption tower 53 is of double cylinder type, wherein an inner cylinder is filled with an ozone adsorbent and an outer cylinder is filled with a heating medium. Silica gel is generally used as the adsorbent, and ethylene glycol or alcohol group as the heating medium. The circulating blower 52, ozone generator 50 and adsorption/desorption tower 53 constitute, in this order, a single circulating system.

Operations will now be explained. There are two operations, namely an adsorbing operation and a desorbing operation of ozone.

The adsorbing operation will first be explained. Oxygen is supplied by the oxygen supplying source 51 so that the pressure in the circulating system is always a constant pressure. At this time, the pressure is normally maintained at 1.5 kg/cm$^2$. When oxygen is made to flow in the circulating system by the circulating blower 52 while the switch valves 57c and 57d are in an opened condition, a part of the oxygen is converted into ozone through silent discharge to generate ozonized oxygen while passing through the discharge space of the ozone generator 50, and the ozonized oxygen is then transferred to the adsorption/desorption tower 53. The adsorvent in the adsorption/desorption tower 53 selectively adsorbs ozone, and the remaining oxygen is returned to the circulating blower 52 through the switch valve 57c. Oxygen which has been consumed as ozone is supplemented through the oxygen supply source 51. At this time, the temperature of the ozone adsorbent is cooled by the cooling source 54 to not more than −30° C. This is because the ozone adsorbing amount of the ozone adsorbent largely varies depending on the temperature. That is, by lowering the temperature, the ozone adsorbing amount increases and by raising the temperature, the ozone adsorbing amount decreases. Therefore, when adsorbing ozone, the adsorbent is cooled, and when desorbing ozone, the temperature of the adsorbent is raised.

When the adsorbent in the adsorption/desorption tower 53 has adsorbed ozone to approach the ozone saturation adsorption amount, the desorbing operation of ozone is performed. In the desorbing operation, operations of the ozone generator 50, the circulating blower 52 and cooling source 54 are terminated and the switch valves 57a to 57d are closed. Thereafter, the heating source 55 and water flow ejector 56 start their operations and switch valves 57e to 57g are opened. In order to enable easy desorption of ozone adsorbed at the adsorbent, heat is applied from the heating source 55 to raise temperature of the adsorbent. Then, by decompressing for sucking ozone in the adsorption/desorption tower 53 at one stroke through the water flow ejector 56, ozone is made to disperse and dissolve into water in the water flow ejector 56 which is then sent as ozone water to places where ozone is used, thereby removal of living things is performed in the object 58 to be treated. By decompression for suction, the achieved pressure in the adsorption/desorption tower 53 is made to be approximately 0.1 kg/cm$^2$ (absolute pressure). When the desorbing period is completed in this way, the process returns to the initial absorbing operation and is coutinuously repeated.

The above conventional intermittent type ozone supplying apparatus presents a drawback that chemical reactive substances, which are generated by reaction of ozone with substances included in a fluid into which ozone is injected, are made to flow into water resources and badly effect the environment thereby. Further, for treating generated chemical reactive substances at real time, a chemical substance removing device of quite high efficiency would be required.

The present invention has been made in view of the above circumstances, and it is an object thereof to provide an ozone supplying apparatus capable of decreasing the amount of fluid containing chemical reactive substances therein which are generated by reaction with ozone.

SUMMARY OF THE INVENTION

The ozone supplying apparatus according to a first invention comprises an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, to desorb ozone from the adsorption/desorption device and to perform treatment of an object by mixing the ozone with fluid, wherein the apparatus further includes a fluid storing means for storing fluid after being injected with ozone and a fluid treating means for treating the fluid after treatment of the object.

The ozone supplying apparatus according to the first invention might include an ozone injecting channel which constitutes a closed loop comprising the fluid storing means, the ozone desorbing means, a fluid supply means for supplying fluid to the ozone desorbing means, and an object to be treated with fluid containing ozone therein.

The ozone supplying apparatus according to the first invention might include an ozone injecting channel which constitutes a closed loop comprising the object to be treated with fluid containing ozone therein between the fluid storing means and the fluid supply means for supplying fluid to the ozone desorbing means.

The ozone supplying apparatus according to the first invention might include a switch valve for making fluid circulate in the ozone injecting channel at the time of injecting ozone.

The ozone supplying apparatus according to the first invention might include a fluid treating channel constituting a closed loop comprising the fluid storing means, the fluid treating means, and the fluid supply means.

The ozone supplying apparatus according to the first invention might include a switch valve for making fluid circulate in the fluid treating channel after injecting ozone.

The ozone supplying apparatus according to a second invention comprises an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, to desorb ozone from the adsorption/desorption device and to perform treatment of an object by mixing the ozone with fluid, wherein the apparatus further includes a fluid treating means for treating fluid after treatment of the object to make creatures grow in the fluid treating means.

The ozone supplying apparatus according to a third invention comprises an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, to desorb ozone from the adsorption/desorption device and to perform treatment of an object by mixing the ozone with fluid, wherein the apparatus further includes a pressure sensor for measuring a pressure in the adsorption/desorption device, a fluid storing means for storing fluid after being injected with ozone, and a fluid treating means for treating fluid after treatment of the object.

DETAILED DESCRIPTION OF THE INVENTION

Embodiment 1

Figure 1:
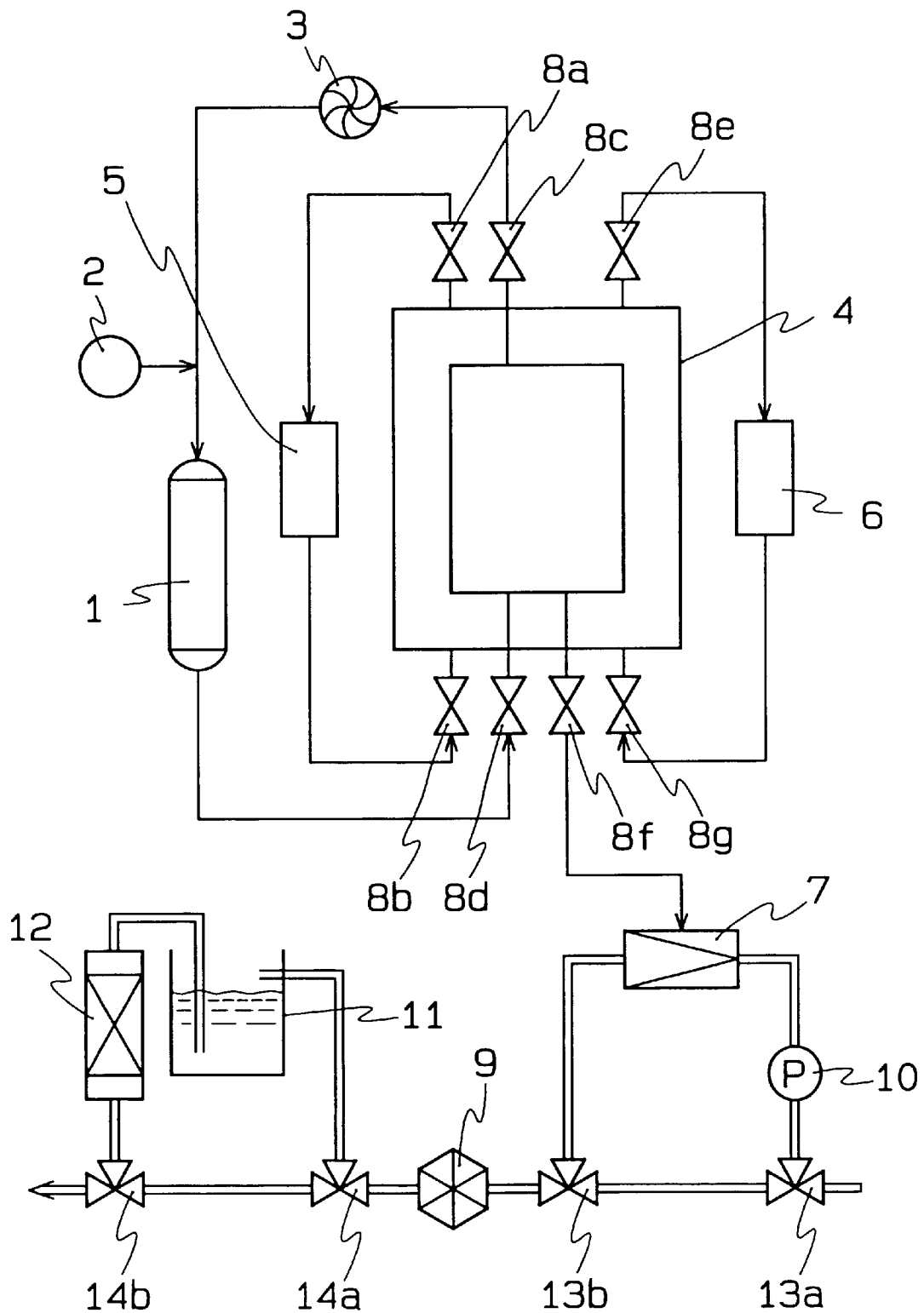
FIG. 1 is a diagram showing an arrangement of an ozone supplying apparatus according to Embodiment 1 of the present invention.

FIG. 1 is a diagram showing an arrangement of an ozone supplying apparatus according to Enbodiment 1 of the present invention In FIG. 1, the apparatus comprises an ozone generator 1, an oxygen supply source 2, a circulating blower 3, an adsorption/desorption tower 4 which is an adsorption/desorption device for temporarily storing generated ozone therein, a cooling source 5 for cooling the adsorption/desorption tower 4, a heating source 6 for heating the adsorption/desorption tower 4, a water flow ejector 7 which is an ozone desorbing means for taking out ozone from the adsorption/desorption tower 4 by decompressing for suction, a group of switch valves 8a to 8g, an object 9 to be treated from which living things are removed by the fluid containing ozone therein, an ejector pump 10 which is a fluid supply means for supplying fluid such as water to the water flow ejector 7, a tank 11 which is a fluid storing means for temporarily storing fluid after removing living things from the object 9 to be treated, a fluid purifying device 12 which is a fluid treating means for removing chemical substances or the like contained in the fluid stored in the fluid storing tank 11, three-port flow rate adjusting valves 13a, 13b, and switch valves 14a, 14b.

Operations of the apparatus will now be explained. There are three operations in total, namely ozone adsorbing operation, ozone desrobing operation, and operation of removing living things with the use of ozone.

The adsorbing operation will first be explained. Oxygen is supplied by the oxygen supply source 2 so that the pressure in the circulating system is always constant. When oxygen is made to flow in the circulating system by the circulating blower 3 while the switch valves 8c and 8d are in an opened condition, a part of the oxygen is converted into ozone through silent discharge to generate an ozonized oxygen while passing through the discharge space of the ozone generator 1, and the ozonized oxygen is then transferred to the adsorption/desorption tower 4. The adsorbent in the adsorption/desorption tower 4 selectively adsorbs ozone, and the remaining oxygen is returned to the circulating blower 3 through the switch valve 8c. Oxygen which has been consumed as ozone is supplemented through the oxygen supply source 2. Since the adsorbent assumes a property that adsorption capacity of ozone increases if the adsorbent is cooled more, the cooling temperature is generally maintained by the cooling source 5 to not more than −40° C. It is preferable to select an adsorbent having a low decomposing rate when it comes into contact with ozone. For example, silica gel, activated alumina or porous materials impregnated with fluorocarbon can be employed. Further, the higher the pressure in the circulating system becomes, the more efficiently ozone can be stored. However, in view of ozone generating efficiency and ozone storing efficiency, an excessive increase of pressure in the circulating system results in an increase in consumption of electricity at the time of storage so that it is desirable to maintain a pressure of about 5 kg/cm$^2$G in maximum.

When the adsorbent in the adsorption/desorption tower 4 has adsorbed ozone to approach the ozone saturation adsorption amount, the desorbing operation of ozone is performed. In the desorbing operation, operations of the ozone generator 1, circulating blower 3 and cooling source 5 are terminated and the switch valves 8a to 8d are closed. Thereafter, the heating source 6 and water flow ejector 7 start their operations and the switch valves 8e and 8f are opened. Simultaneously, three-port flow rate adjusting valves 13a, 13b are actuated so that a minimum amount of fluid required for driving the water flow ejector 7 is sent to the ejector pump 10 and switch valves 14a, 14b are switched. At this time, in order to enable easy desorption of ozone adsorbed at the adsorbent, heat is applied from the heating source 6 to raise temperature of the adsorbent. Then, by supplying fluid from the ejector pump 10 to the water flow ejector 7, ozone in the adsorption/desorption tower 4 is decompressed for suction to the water frow ejector 7 and ozone is made to disperse and dissolve into water in the water flow ejector 7 which is then sent as fluid containing ozone therein to the three-port flow rate adjusting valve 13b. In the three-port flow rate adjusting valve 13b, fluid containing ozone therein is mixed with fluid not containing ozone therein, which is then sent to the object 9 to be treated. By decompressing for suction, the achieved pressure in the adsorption/desorption tower 4 is made to be approximately 0.1 kg/cm² (absolute pressure). When the desorbing period is completed in this way, the process returns to the initial adsorbing operation and is continuously repeated. It should be noted that the desorption operation might be started when ozone of a preset density has started to flow out from the addorption/desorption tower 4.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated is supplied to the fluid storing tank 11 via the switch valve 14a where it is temporarily stored. Excessive ozone and oxide which have not contributed to the removal of living things are contained in the stored fluid, so that the fluid is sent to the fluid purifying device 12 by small amounts and is released after ozone and oxide have been decomposed and removed therefrom. It should be noted that, upon storage of fluid containing ozone and oxide therein in the fluid storing tank 11, the three-port flow rate adjusting valves 13a and 13b are terminated and switch valves 14a and 14b are switched so that a normal fluid removing channel is assumed.

A tower filled with activated carbon is usually employed as the fluid purifying device 12. Since a removing capacity of the tower filled with activated carbon is a function of a contact time, the contact time needs to be made long in order to improve the removing capacity. That is, the fluid moving speed in the tower needs to be made slow or the height of the tower filled with activated carbon needs to be made high. Further, since relationship between the fluid moving speed in the tower and the height of the tower filled with activated carbon is a proportional relation if a removing capacity is constant, the height of the tower filled with activated carbon can be made low when the fluid moving speed is slowed. Since this embodiment is arranged in such a manner that the fluid storing tank 11 is disposed between the object 9 to be treated and the fluid purifying device 12, and the object 9 to be treated is intermittently removed of living things, fluid containing ozone or oxide therein can be supplied to the fluid purifying device 12 by small amounts so that the height of the tower filled with activated carbon can be made low and the fluid purifying device 12 small.

In the case where brominated ion or the like is contained in the fluid and ozone is injected into this fluid, oxidants are generated. In such a case, an ultraviolet light irradiating device might be employed as the fluid purifying device 12. When employing an ultraviolet light irradiating device, contact time is similarly required to be made long to improve removing capacity. However, since fluid containing ozone or oxide therein can be supplied to the fluid purifying device 12 by small amounts in this embodiment, residence time can be set to be long and a channel through which fluid flows can be made narrow. Therefore, ultraviolet light can be efficiently irradiated to the fluid containing oxidants therein, and oxide can be efficiently decomposed and removed while maintaining a suitable size for the fluid purifying device 12.

It should be noted that this embodiment has been explained by taking a case in which the three-port flow rate adjusting valves 13a, 13b are actuated at the time of injecting ozone and the amount of fluid sent to the water flow ejector 7 is set to a minimum amount required for driving the water flow ejector 7 for treating the object 9 to be treated by making fluid join at the switch valve 13b. However, by arranging the apparatus such that the whole amount of fluid is made to be sent to the water flow ejector 7 at the time of injecting ozone, the water flow ejector 7 can be made large and the ejector pump 10 can be omitted.

Further, it should be noted that this embodiment has been explained by taking a case in which the three-port flow rate adjusting valves 13a, 13b are actuated at the time of injecting ozone and the amount of fluid sent to the water flow ejector 7 is set to a minimum amount required for driving the water flow ejector 7 for treating the object 9 to be treated by making fluid join at the switch valve 13b. However, two two-port flow rate adjusting valves might be alternatively employed instead of the three-port flow rate adjusting valves 13a.

Further, while this embodiment has been explained by taking a case in which the cooling source 5 and heating source 6 are independently arranged, it is also possible to employ a temperature adjusting device which is capable of performing both cooling and heating.

Embodiment 2

Figure 2:
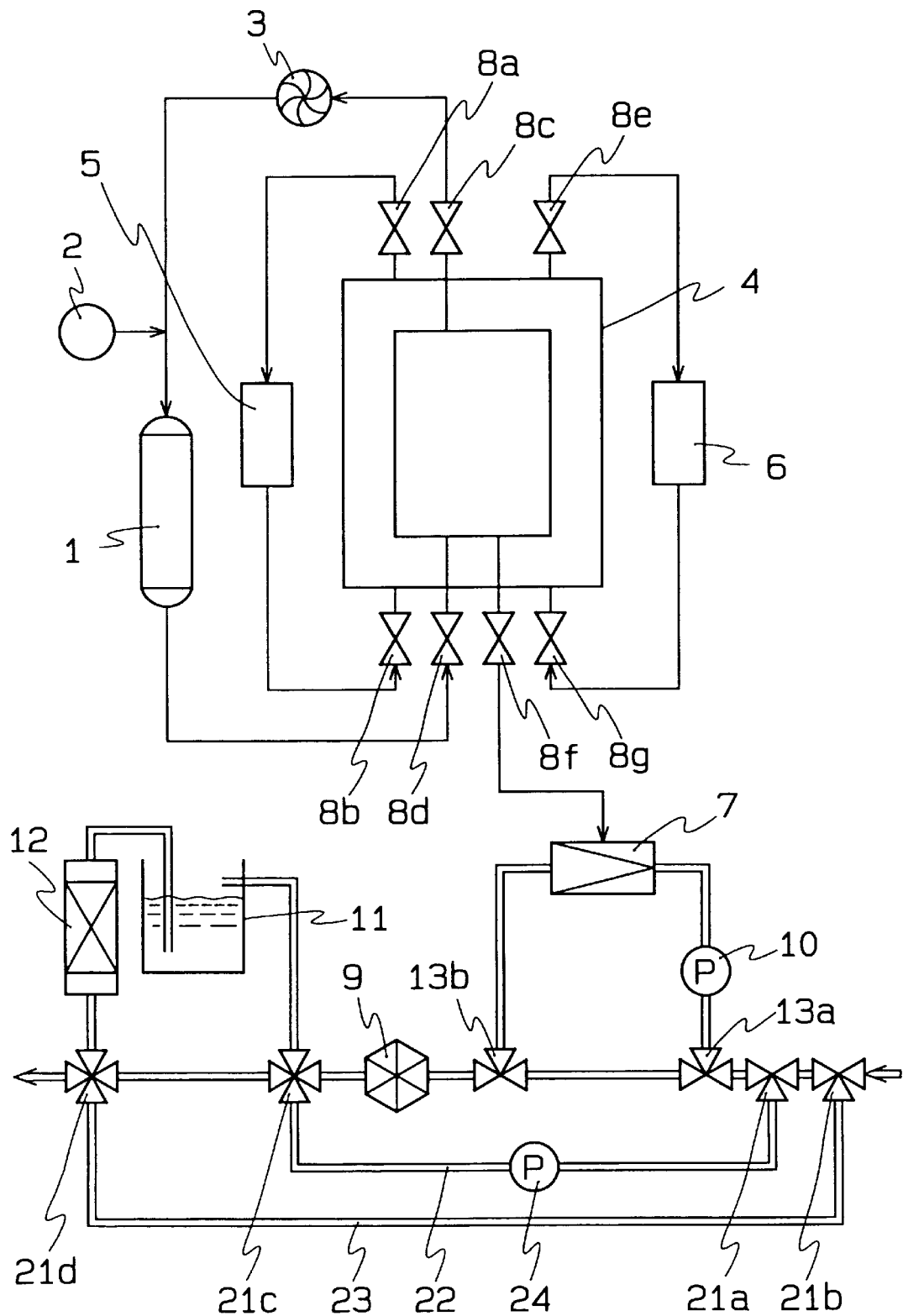
FIG. 2 is a diagram showing an arrangement of an ozone supplying apparatus according to Embodiment 2 of the present invention.

FIG. 2 is a diagram showing an arrangement of an ozone supplying apparatus according to Embodiment 2 of the present invention, and numerals which are identical with those of Embodiment 1 indicate identical or equivalent portions, and explanations thereof will thus be omitted.

Numerals 21a to 21d denote a group of switch valves for changing channels through which fluid flows at the time of injecting ozone, 22 a circulating piping for supplying fluid injected with ozone again to the ejector pump 10, 23 a bypass piping through which fluid flows while the object 9 to be treated is removed of living things, and 24 a circulating pump which is a second fluid supply means provided in the circulating piping 22.

Operations will now be explained. There are three operations, namely ozone adsorbing operations, ozone desorbing operations, and operation of removing living things with the use of ozone. However, since the ozone adsorbing operations are identical with those of Embodiment 1, explanations thereof will be omitted here.

When the adsorbent in the adsorption/desorption tower 4 has adsorbed ozone to approach the ozone saturation adsorption amount, the desorbing operation of ozone is performed. In the desorbing operation, operations of the ozone generator 1, circulating blower 3 and cooling source 5 are terminated and switch valves 8a to 8d are closed. Thereafter, the heating source 6 and ejector pump 10 start their operation and the switch valves 8e to 8g are opened. Simultaneously, the three-port flow rate adjusting valves 13a, 13b are actuated so that a minimum amount of fluid required for driving the water flow ejector 7 is sent to the ejector pump 10, and switch valves 21a to 21d are switched. At this time, heat is applied from the heating source 6 to raise the temperature of the adsorbent in order to enable easy desorption of ozone adsorbed at the adsorbent. Then, by supplying fluid from the ejector pump 10 to the water flow ejector 7, ozone in the adsorption/desorption tower 4 is decompressed for suction by the water flow ejector 7 and ozone is made to disperse and dissolve into fluid in the water flow ejector 7 which is then sent as fluid containing ozone therein to the three-port flow rate adjusting valve 13b. In the three-port flow rate adjusting valve 13b, fluid containing ozone therein is mixed with fluid not containing ozone therein, which is then sent to the object 9 to be treated. At this time, the achieved pressure in the adsorption/desorption tower 4 by decompression for suction is approximately 0.1 kg/cm$^2$ (absolute pressure). When the desorbing period is completed in this way, the process returns to the initial adsorbing process and is continuously repeated. It should be noted that the desorbing process might be started when ozone of a preset density has started to flow out from the adsorption/desorption tower 4.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated flows into the circulating piping 22 by passing through switch valve 21c and is supplied to the circulating pump 24. Fluid containing ozone and oxide therein is again sent to the three-port flow rate adjusting valve 13a through switch valve 21a, and a part of the fluid is supplied to the ejector pump 10 and is used as fluid for operating the water flow ejector 7. That is, during injection of ozone, the switch valve 21a, three-port flow rate adjusting valves 13a, 13b, object 9 to be treated, switch valve 21c, and circulating pump 24 form a closed loop of a circulating line. When the living things removing process for the object 9 to be treated is completed, the switch valve 21c is switched and fluid containing excessive ozone and oxide therein is supplied to the fluid storing tank 11. The stored fluid is sent to the fluid purifying device 12 by small amounts and is released after decomposing and removing ozone and oxide. It should be noted that, upon completion of storing fluid containing ozone and oxide therein in the fluid storing tank 11, the three-port flow rate adjusting valves 13a, 13b are terminated, switch valves 21a to 21d are switched and a normal fluid moving channel is assumed.

Since the switch valve 21a, three-port flow rate adjusting valves 13a, 13b, object 9 to be treated, switch valve 21c, and circulating pump 24 form a closed loop of a circulating line during injection of ozone in this embodiment, the amount of generated fluid containing ozone and oxide therein can be made small and the fluid storing tank 11 can be miniaturized.

Embodiment 3

Figure 3:
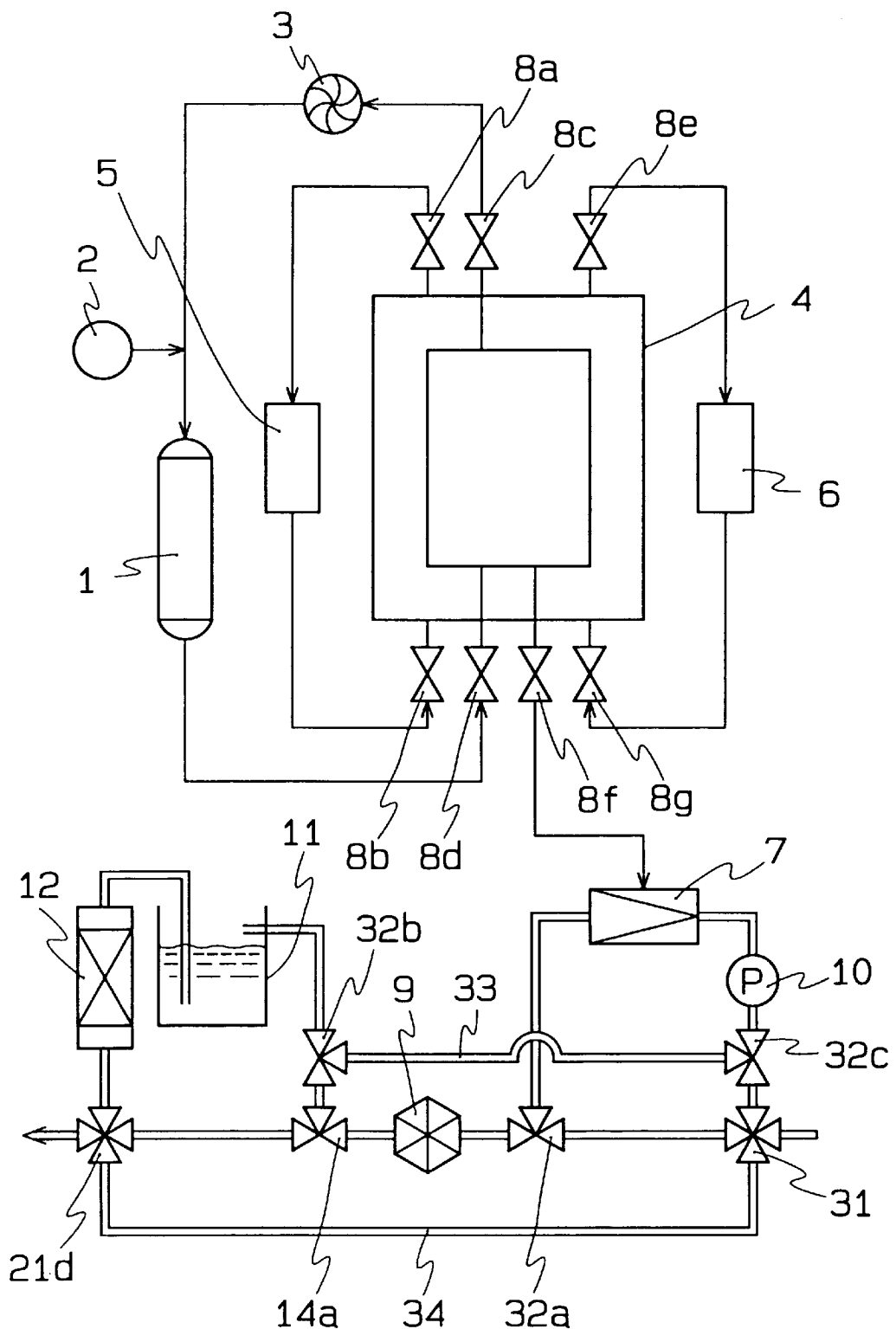
FIG. 3 is a diagram showing an arrangement of an ozone supplying apparatus according to Embodiment 3 of the present invention.

FIG. 3 is a diagram showing an arrangement of an ozone supplying apparatus according to Embodiment 3 of the present invention, and numerals which are identical with those of Embodiment 1 indicate identical or equivalent portions, and explanations thereof will thus be omitted.

Numeral 31 denotes a four-port switch valve which is capable of changing directions of fluid to flow into three directions, 32a to 32c switch valves for changing channels for the fluid to flow at the time of injecting ozone, 33 a circulating piping for supplying fluid injected with ozone again to the ejector pump 10, and 34 a bypass piping through which fluid flows while the object 9 to be treated is removed of living things.

Operations will now be explained. There are three operations, namely ozone adsorbing operations, ozone desorbing operations, and operations of removing living things with the use of ozone. However, since the ozone adsorbing operations are identical with those of Embodiment 1, explanations thereof will be omitted here.

When the adsorbent in the adsorption/desorption tower 4 has adsorbed ozone to approach the ozone saturation adsorption amount, desorbing of ozone is performed. In the desorbing operation, operations of the ozone generator 1, circulating blower 3 and cooling source 5 are terminated and switch valves 8a to 8d are closed. Thereafter, the heating source 6 and ejector pump 10 start their operation and the switch valves 8e to 8f are opened. Simultaneously, the four-port switch valve 31 is switched so that a minimum amount of fluid required for operating the water flow ejector 7 is sent to the ejector pump 10, and switch valves 32a to 32c are switched. When the switch valve 32c is switched, the four-port switch valve 31 is again switched so that fluid is made to flow into the bypass piping 34. At this time, heat is applied by the heating source 6 to raise temperature of adsorbent in order to enable easy desorption of ozone adsorbed at the adsorbent. When fluid is supplied from the ejector pump 10 to the water flow ejector 7, ozone in the adsorption/desorption tower 4 is decompressed for suction by the water flow ejector 7 so that ozone is made to disperse and dissolve into the fluid in the water flow ejector 7 and is sent to the object 9 to be treated via switch valve 32a. At this time, the achieved pressure in the adsorption/desorption tower 4 by the decompression for suction is approximately 0.1 kg/cm$^2$ (absolute pressure). When desorbing period is completed in this way, the process returns to the initial adsorbing process and is continuously repeated. It should be noted that the desorbing process might be started when ozone of a preset density has started to flow out from the adsorption/desorption tower 4.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated flows into the circulating piping 33 by passing through switch valve 14a and switch valve 32b. Thereafter, fluid containing ozone and oxide therein is supplied to the ejector pump 10 via the switch valve 32c and is used as fluid for operating the water flow ejector 7. That is, during injection of ozone, the switch valve 32c, switch valve 32a, object 9 to be treated, switch valve 14a, and switch valve 32b form a closed loop of a circulating line. When the living things removing process for the object 9 to be treated is completed, the switch valve 32b is switched and fluid containing excessive ozone and oxide therein is supplied to the fluid storing tank 11. The stored fluid is sent to the fluid purifying device 12 by small amounts and is released after decomposing and removing ozone and oxide. It should be noted that, upon completion of storing fluid containing ozone and oxide therein in the fluid storing tank 11, the four-port switch valve 31, switch valve 32a, switch valve 14a, and switch valve 21d are switched and a normal fluid moving channel is assumed.

Since the switch valve 32c, switch valve 32a, object 9 to be treated, switch valve 14a, and switch valve 32b form a closed loop of a circulating line during injection of ozone in this embodiment, the amount of generated fluid containing ozone and oxide therein can be made small and the fluid storing tank 11 can be miniaturized. Further, since fluid containing ozone of high density therein can be generated, the living things removing effect can be improved.

Embodiment 4

Figure 4:
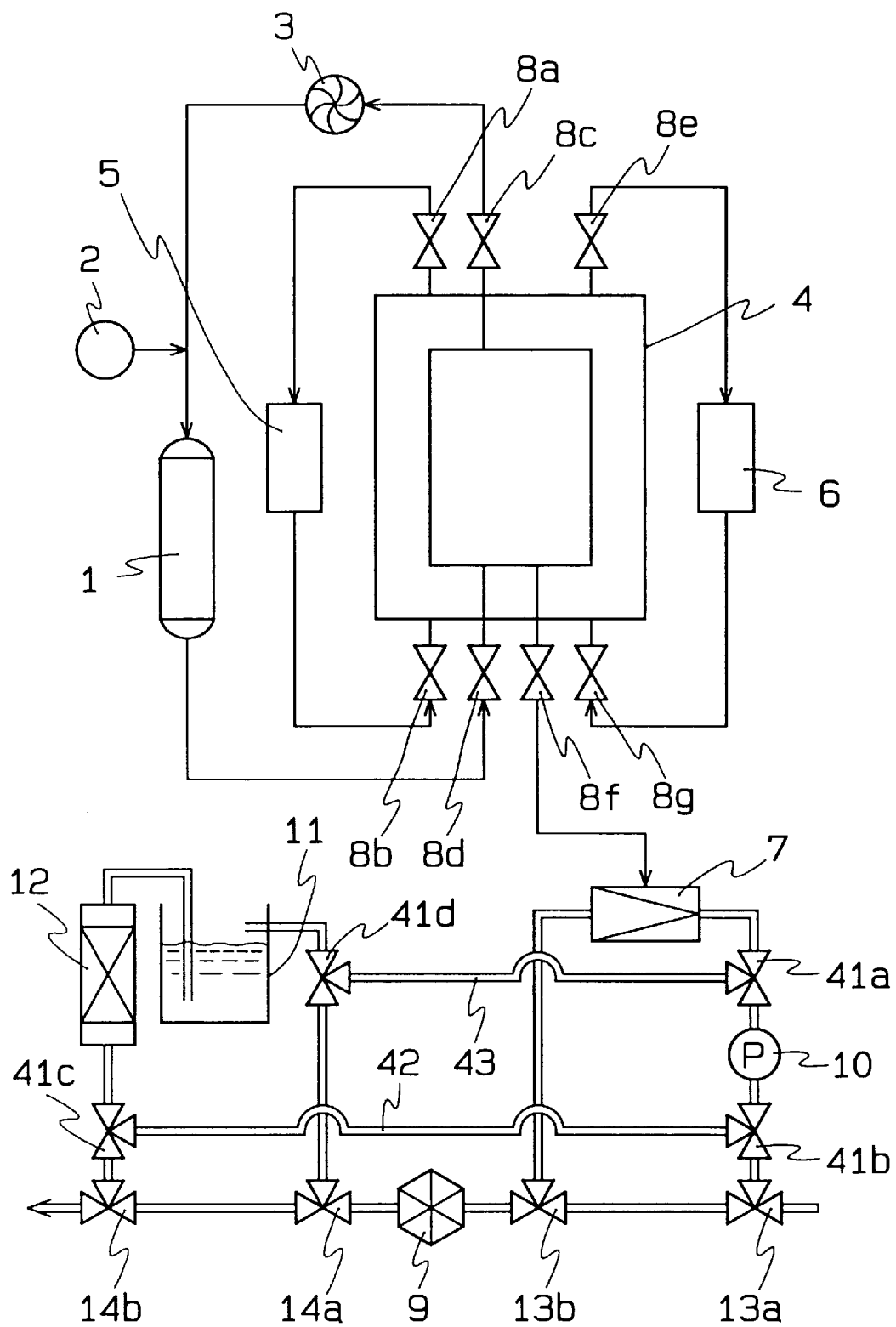
FIG. 4 is a diagram showing an arrangement of an ozone supplying apparatus according to Embodiment 4 of the present invention.

FIG. 4 is a diagram showing an arrangement of an ozone supplying apparatus according to Embodiment 4 of the present invention, and numerals which are identical with those of Embodiment 1 indicate identical or equivalent portions, and explanations thereof will thus be omitted.

Numerals 41a to 41d denote switch valves for changing channels through which fluid flows at the time of purifying fluid containing ozone or oxide therein, 42 a circulating piping for discharge for introducing fluid which is discharged from the fluid purifying device 12 to an inlet of the ejector pump 10, and 43 a circulating piping for supply for introducing fluid which is discharged from the ejector pump 10 into the fluid storing tank 11.

Operations will now be explained. There are three operations, namely ozone adsorbing operations, ozone desorbing operations, and operations of removing living things with the use of ozone. However, since the ozone adsorbing operations and ozone desorbing operations are identical with those of Embodiment 1, explanations thereof will be omitted here.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated is supplied to the fluid storing tank 11 via switch valve 41d and is temporarily stored thereat. The stored fluid contains therein excessive ozone and oxide which have not contributed to removal of living things, and the stored fluid is sent to the fluid purifying device 12. Fluid which is discharged from the fluid purifying device 12 is introduced to the ejector pump 10 by passing through the circulating piping for discharge 42. Thereafter, fluid which is discharged from the ejector pump 10 is again introduced to the fluid storing tank 11 by passing through the circulating piping for supply 43. That is, at the time of purifying fluid, the switch valves 41a, 41d, fluid storing tank 11, fluid purifying device 12, switch valves 41c, 41b, and ejector pump 10 form a closed loop for a circulating line. When ozone density and oxide density in the fluid flowing through the circulating line fall below environmental reference values, the fluid is discharged through switch valves 41c, 14b. Performance of discharge might be decided by observing a density of ozone and oxide, or might alternatively be decided based on a treatment time for fluid. It should be noted that once fluid containing ozone and oxide therein is stored in the fluid storing tank 11, the three-port flow rate adjusting valves 13a, 13b and switch valves 14a, 14b are switched and a normal fluid moving channel is assumed.

Since the switch valves 41a, 41d, fluid storing tank 11, fluid purifying device 12, switch valves 41c, 41b, and ejector pump 10 form a closed loop for a circulating line at the time of purifying fluid in this embodiment, the capacity of the fluid purifying device 12 can be made small.

Embodiment 5

Figure 5:
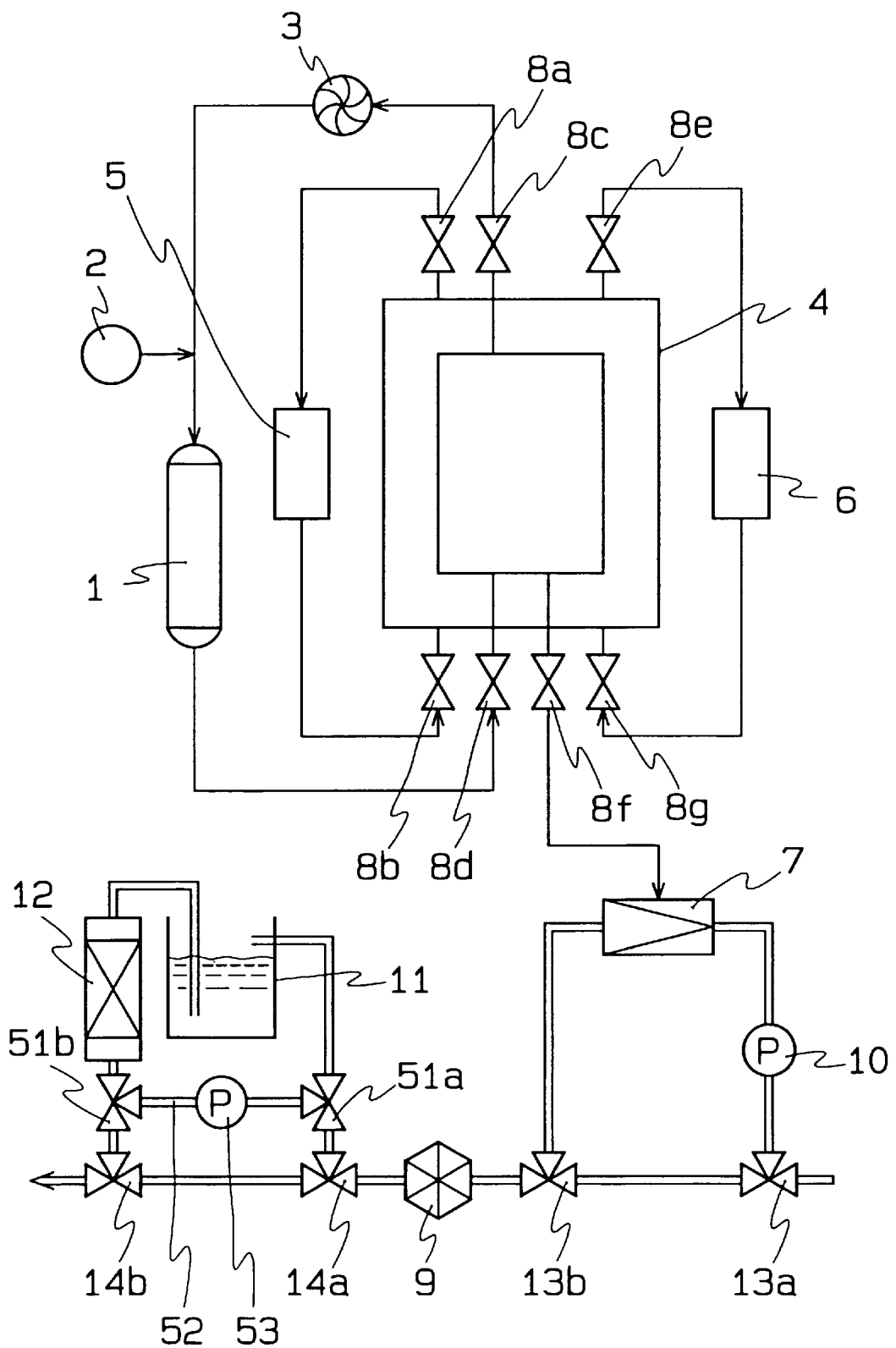
FIG. 5 is a diagram showing an arrangement of an ozone supplying apparatus according to Embodiment 5 of the present invention.

FIG. 5 is a diagram showing an arrangement of an ozone supplying apparatus according to Embodiment 5 of the present invention, and numerals which are identical with those of Embodiment 1 indicate identical or equivalent portions, and explanations thereof will thus be omitted.

Numerals 51a to 51b denote switch valves for changing channels through which fluid flows at the time of purifying fluid containing ozone or oxide therein, 52 a circulating piping for connecting switch valve 51a and switch valve 51b, and 53 a circulating pump which is a third fluid supply means for making fluid containing ozone and oxide therein circulate.

Operations will now be explained. There are three operations, namely ozone adsorbing operations, ozone desorbing operations, and operations of removing living things with the use of ozone. However, since the ozone adsorbing operations and ozone desorbing operations are identical with those of Embodiment 1, explanations thereof will be omitted here.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated is supplied to the fluid storing tank 11 via switch valve 51a and is temporarily stored thereat. The stored fluid contains therein excessive ozone and oxide which have not contributed to removal of living things, and the stored fluid is sent to the fluid purifying device 12. Fluid which is discharged from the fluid purifying device 12 is introduced to the circulating pump 53 by passing through the circulating piping 52. Thereafter, fluid which is discharged from the circulating pump 53 is again introduced to the fluid storing tank 11. That is, at the time of purifying fluid, the switch valves 51a, fluid storing tank 11, fluid purifying device 12, switch valve 51b, and circulating pump 53 form a closed loop for a circulating line. When ozone density and oxide density in the fluid flowing through the circulating line fall below environmental reference values, the fluid is discharged through switch valves 51a, 51b. Performance of discharge might be decided by observing a density of ozone and oxide, or might alternatively be decided based on a treatment time for fluid. It should be noted that once fluid containing ozone and oxide therein is stored in the fluid storing tank 11, the three-port flow rate adjusting valves 13a, 13b and switch valves 14a, 14b are switched and a normal fluid moving channel is assumed.

Since the switch valve 51a, fluid storing tank 11, fluid purifying device 12, switch valves 51b, and circulating pump 53 form a closed loop for a circulating line at the time of purifying fluid in this embodiment, the capacity of the fluid purifying device 12 can be made small. Further, although the number of parts increases due to an increase in number of pumps, the piping can be shortened and thus the control simplified.

Embodiment 6

Figure 6:
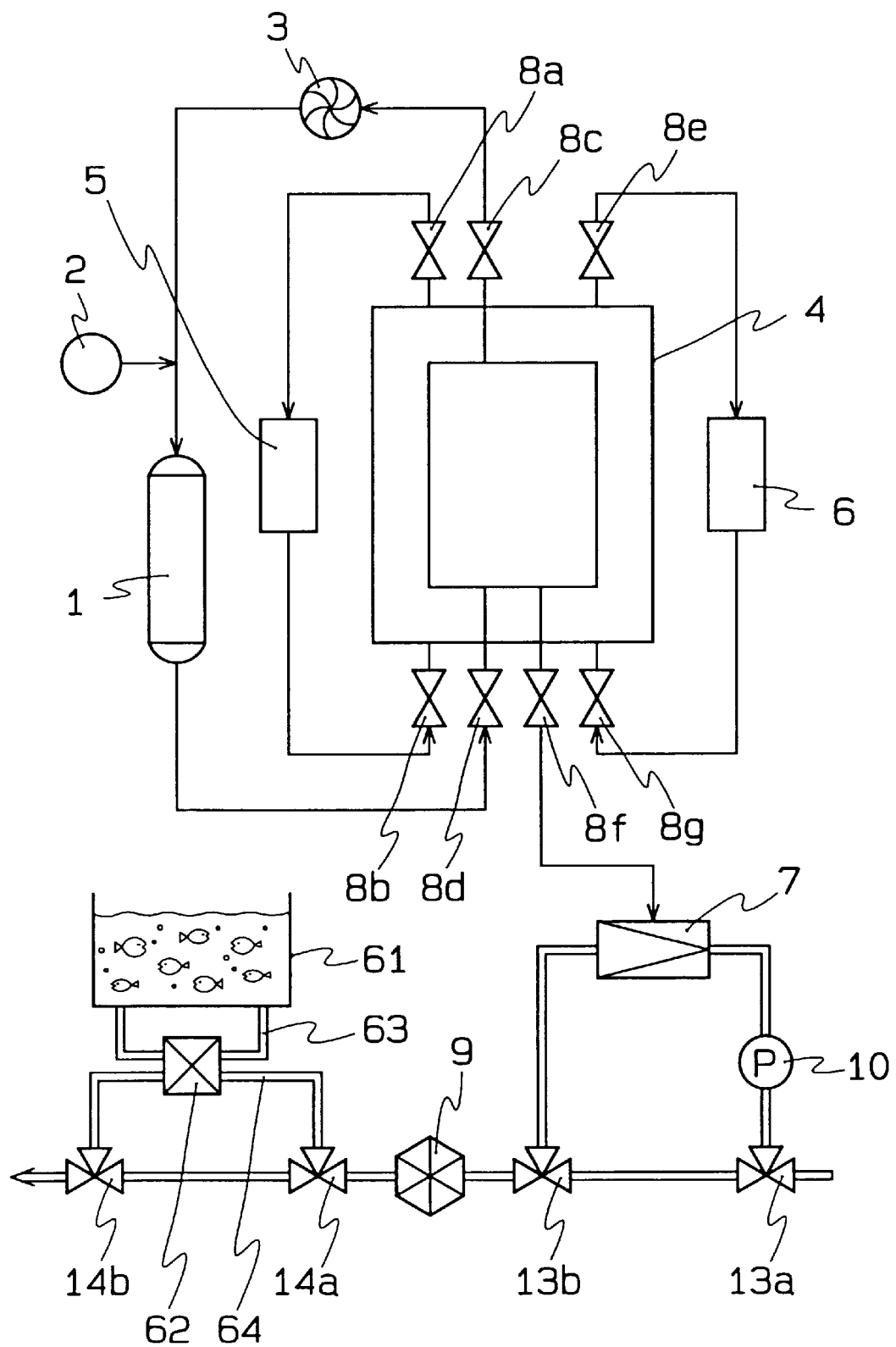
FIG. 6 is a diagram showing an arrangement of an ozone supplying apparatus according to Embodiment 6 of the present invention.

FIG. 6 is a diagram showing an arrangement of an ozone supplying apparatus according to Embodiment 6 of the present invention, and numerals which are identical with those of Embodiment 1 indicate identical or equivalent portions, and explanations thereof will thus be omitted.

Numeral 61 denotes a creature growing vessel for growing creatures such as fish therein, 62 a fluid mixer for mixing fluid in the creature growing vessel 61 with fluid which has been employed for removing living things, 63 a fluid treating piping for connecting the creature growing vessel 61 and the fluid mixer 62, and 64 a fluid supply piping for supplying fluid containing ozone and oxide therein to the fluid mixer 62.

Operations will now be explained. There are three operations, namely ozone adsorbing operations, ozone desorbing operations, and operations of removing living things with the use of ozone. However, since the ozone adsorbing operations and ozone desorbing operations are identical with those of Embodiment 1, explanations thereof will be omitted here.

When fluid containing ozone therein is supplied to the object 9 to be treated, living things such as microorganisms or shellfish existing in the object 9 to be treated are perished by ozone and oxide generated from ozone, whereby the object 9 to be treated is removed of living things. Fluid which has passed through the object 9 to be treated is supplied to the fluid mixer 62 by passing through switch Valve 14a. The fluid mixer 62 is also supplied with fluid from the creature growing vessel 61. The fluid in the creature growing vessel 61 contains ammonia or the like therein which is discharged by creatures. In the fluid mixer 62, ammonia or the like in fluid which is discharged from the creature growing vessel 61 reacts with ozone or oxide and is decomposed. A part of the fluid which has been treated in the fluid mixer 62 is returned to the creature growing vessel 61 and the remaining fluid is discharged via switch valve 14b.

Since ozone or oxide is decomposed by employing ammonia components generated in the creature growing vessel 61 in this embodiment, fluid containing ozone or oxide therein can be efficiently treated and purification of fluid in the creature growing vessel 61 can be performed.

Embodiment 7

Figure 7:
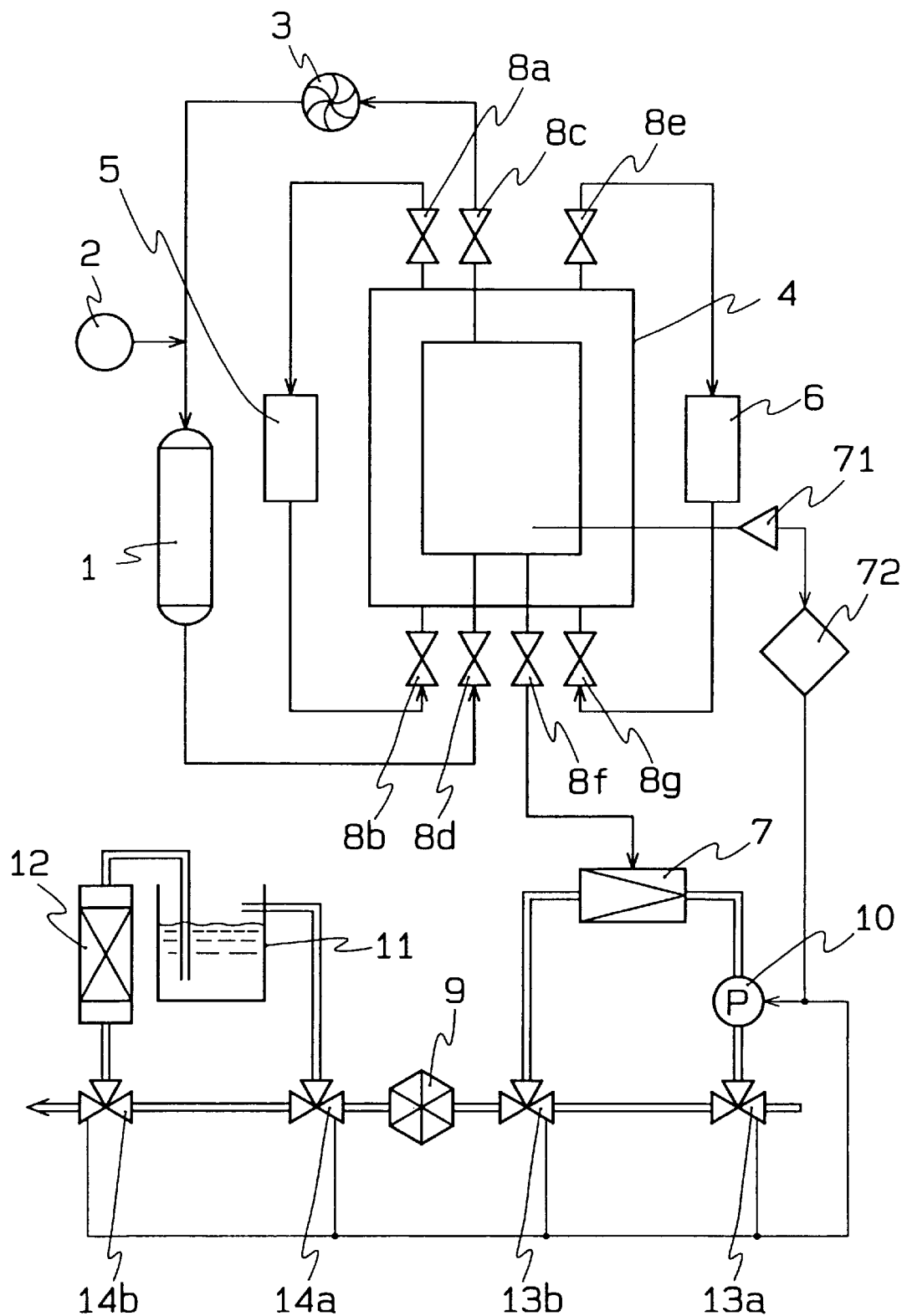
FIG. 7 is a diagram showing an arrangement of an ozone supplying apparatus according to Embodiment 7 of the present invention.
Figure 8:
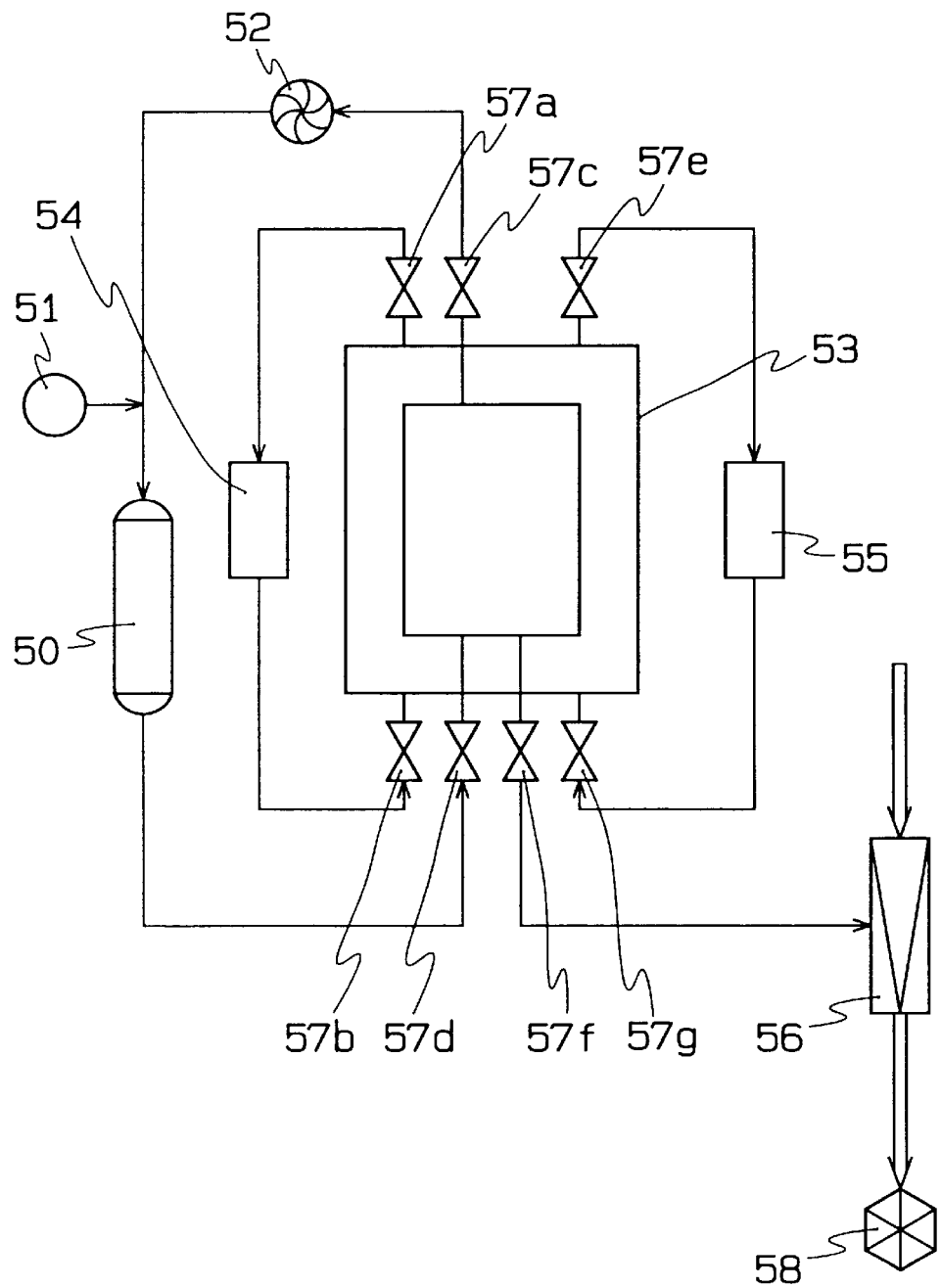
FIG. 8 is a diagram showing an arrangement of a conventional intermittent type ozone supplying apparatus.

FIG. 7 is a diagram showing an arrangement of an ozone supplying apparatus according to Embodiment 7 of the present invention, and numerals which are identical with those of Embodiment 1 indicate identical or equivalent portions, and explanations thereof will thus be omitted.

Numeral 71 denotes a pressure sensor for measuring a pressure in the adsorption/desorption device, and 72 a controller for sending a signal for operating the ejector pump 10, three-port flow rate adjusting valves 13a, 13b, and switch valves 14a, 14b upon receipt of a signal from the pressure sensor 71.

Operations will now be explained. Oxygen is supplied from the oxygen supply source 2 so that the circulating system is always maintained at a constant pressure. When oxygen is made to flow into the circulating system by the circulating blower 3 while switch valves 8c and 8d are in an opened condition, a part of the oxygen is converted into ozone through silent discharge to generate ozonized oxygen while passing through discharge space of the ozone generator 1 and ozonized oxygen is then transferred to the adsorption/desorption tower 4. The adsorbent in the adsorption/desorption tower 4 selectively adsorbs ozone, and the remaining oxygen is returned to the circulating blower 3 through the switch valve 8c. Oxygen which has been consumed as ozone is supplemented through the oxygen supply source 2.

While the circulating system is normally maintained at a constant pressure at the time of adsorbing ozone, a signal is sent from the pressure sensor 71 to the controller 72 when the pressure in the circulating system becomes high due to a breakdown of the apparatus or the like. Upon receipt of this signal, the controller 72 forcibly shifts to the desorbing process even when the adsorbing operation is being performed. In the desorbing operation, operations of the ozone generator 1, circulating blower 3 and cooling source 5 are terminated and the switch valves 8a to 8d are closed. Thereafter, the ejector pump 10 starts its operation and switch valves 8e to 8g are opened. Simultaneously, the three-port flow rate adjusting valves 13a, 13b are operated to send a minimum amount of fluid required for operating the water flow ejector 7 to the ejector pump 10, and switch valves 14a, 14b are switched. Then, when fluid is supplied from the ejector pump 10 to the water flow ejector 7, ozone in the adsorption/desorption tower 4 is decompressed for suction by the water flow ejector 7 and is made to disperse and dissolve into fluid in the water flow ejector 7, which is sent to the three-port flow rate adjusting valve 13b as fluid containing ozone therein. At this time, fluid containing ozone therein and fluid not containing ozone therein are mixed and sent to the object 9 to be treated.

Fluid which has passed through the object 9 to be treated is supplied to the fluid storing tank 11 via switch valve 14a and is temporarily stored thereat. Excessive ozone and oxide are contained in the stored fluid which is sent to the fluid purifying device 12 by small amounts and is released after ozone and oxide have been decomposed and removed therefrom. It should be noted that, upon storage of fluid containing ozone and oxide therein in the fluid storing tank 11, the three-port flow rate adjusting valves 13a, 13b are terminated and switch valves 14a, 14b are switched so that a normal fluid removing channel is assumed. However, when this series of operations is completed, the process does not return to the ozone adsorbing operation as in the case of normal driving operation but it is instead displayed that an abnormality has occurred and the ozone supplying operation is terminated.

Since an abnormal operation which has occurred at the time of adsorbing ozone is solved by operations performed at the time of removing living things in this embodiment, it is not required to include a separate safety device for solving abnormalities at the time of adsorbing ozone, whereby the number of composing devices for the ozone supplying apparatus can be decreased.

The ozone supplying apparatus according to the first invention comprises a fluid storing tank for storing fluid after being injected with ozone and a fluid purifying device for treating the fluid after treatment of an object, whereby it can be prevented for causing environmental pollution through fluid after removing living things therefrom, performance of the fluid purifying device can be decreased, and costs for the ozone supplying apparatus can be made low.

When the ozone supplying apparatus according to the first invention includes an ozone injecting channel which constitutes a closed loop comprising the fluid storing tank for storing fluid after being injected with ozone, a water flow ejector, a fluid supply means for supplying fluid to the water flow ejector, and an object to be treated with fluid containing ozone therein, the amount of fluid used for removal of living things can be decreased, the fluid storing tank can be made compact, and performance of the fluid purifying device can be decreased.

When the ozone supplying apparatus according to the first invention includes an ozone injecting channel which constitutes a closed loop comprising the object to be treated with fluid containing ozone therein between the fluid storing means and the fluid supply means for supplying fluid to the ozone desorbing means, the amount of fluid used for the removal of living things can be decreased, the fluid storing tank can be made compact, and performance of the fluid purifying device can be decreased.

When the ozone supplying apparatus according to the first invention includes a switch valve for making fluid circulate in the ozone injecting channel at the time of injecting ozone, the amount of fluid used for the removal of living things can be decreased, the fluid storing tank can be made compact, and performance of the fluid purifying device can be decreased.

When the ozone supplying apparatus according to the first invention includes a fluid treating channel constituting a closed loop comprising the fluid storing tank for storing fluid after being injected with ozone, the fluid purifying means for treating the fluid after treating the object to be treated, and an ejector pump for supplying fluid to the ozone injection portion, chemical reactive substances which are generated by reaction of ozone with substances contained in the fluid into which ozone is injected can be effectively decomposed and removed, and performance of the fluid purifying device can be decreased.

When the ozone supplying apparatus according to the first invention includes a switch valve for making fluid circulate in the fluid treating channel after injecting ozone, chemical reactive substances which are generated by reaction of ozone with substances contained in the fluid into which ozone is injected can be effectively decomposed and removed, and performance of the fluid purifying device can be decreased.

The ozone supplying apparatus according to the second invention comprises a fluid purifying device for treating fluid after treatment of an object and is arranged to grow creatures in the fluid treating means, whereby it can be prevented for causing environmental pollution through fluid after removing living things therefrom.

The ozone supplying apparatus according to the third invention comprises a pressure sensor for measuring a pressure in the adsorption/desorption tower, whereby the system employed for removing living things can be also used as a safety device which is used when excessive pressure exists in the adsorption/desorption tower, and the number of composing devices of the ozone supplying apparatus can be decreased.

What is claimed is:

1. An ozone supplying apparatus comprising:
    an ozone generator for generating ozonized oxygen from raw material oxygen,
    an adsorption/desorption device for adsorbing and storing ozone from ozonized oxygen and desorbing the ozone connected to said ozone generator,
    an ozone desorbing means including a fluid flow ejector connected to said adsorption/desorption device for removing ozone therefrom,
    the adsorption/desorption device being connected to the ozone generator to return oxygen to the ozone generator after desorbing ozone therefrom by the adsorption/desorption device,
    a fluid supply means connected with and supplying fluid through the fluid flow ejector for injecting ozone into the fluid,
    an object to be treated with the fluid containing ozone connected to the fluid supply means downstream of the fluid flow ejector, wherein
    the apparatus further includes a fluid storing means connected to the object for storing the fluid containing ozone after treatment of the object,
    a fluid treating means connected to the fluid storing means for treating the fluid to remove ozone and oxide therefrom after treatment of the object, and
    a first fluid treating channel connected to the treating means, whereby fluid released from the apparatus is treated prior to release.

2. The apparatus of claim 1, wherein the apparatus includes an ozone injecting channel which constitutes a closed loop comprising the fluid storing means, the fluid flow ejector, the fluid supply means for supplying fluid to the fluid flow ejector, and the object to be treated with fluid containing ozone therein.

3. The apparatus of claim 2, wherein the apparatus includes a switch valve for making fluid circulate in the ozone injecting channel at the time of injecting ozone.

4. The apparatus of claim 1, wherein the apparatus includes an ozone injecting channel which constitutes a closed loop comprising the object to be treated with fluid containing ozone therein between the fluid storing means and the fluid supply means for supplying fluid to the fluid flow ejector.

5. The apparatus of claim 4, wherein the apparatus includes a switch valve for making fluid circulate in the ozone injecting channel at the time of injecting ozone.

6. The apparatus of claim 1, wherein the apparatus includes a switch valve for making fluid circulate in an ozone injecting channel at the time of injecting ozone.

7. The apparatus of claim 1, wherein the apparatus includes a second fluid treating channel constituting a closed loop comprising the fluid storing means, the fluid treating means, and the fluid supply means.

8. The apparatus of claim 7, wherein the apparatus includes a switch valve for making fluid circulate in the second fluid treating channel after injecting ozone.

9. An ozone supplying apparatus according to claim 1, wherein the fluid supply means comprises a first channel and a second channel, the first channel extending through the fluid flow ejector and joining with the second channel upstream of the object; and
    valve means for adjusting the flow of fluid through the first channel and the second channel.

10. An ozone supply apparatus according to claim 9, wherein the first channel includes an ejector pump for pumping fluid through the fluid flow ejector.

11. An ozone supplying apparatus comprising
    an ozone generator for generating ozonized oxygen from raw material oxygen,
    an adsorption/desorption device for adsorbing and storing ozone from ozonized oxygen and desorbing the ozone connected to the ozone generator,
    an ozone desorbing means including a fluid flow ejector connected to said adsorption/desorption device for removing ozone therefrom,
    the adsorption/desorption device being connected to the ozone generator to return oxygen to the ozone generator after desorbing ozone therefrom by the adsorption/desorption device,
    a fluid supply means connected with and supplying fluid through the fluid flow ejector for injecting ozone into the fluid,
    an object to be treated with the fluid injected with ozone connected to the fluid supply means downstream of the fluid flow ejector, wherein
    the apparatus further includes a fluid purifying device connected to the object for purifying fluid after treatment of the object, and
    the purifying device comprising a creature growing vessel containing growing creatures.

12. An ozone supplying apparatus according to claim 11, wherein the fluid supply means comprises a first channel and a second channel, the first channel extending through the fluid flow ejector and joining with the second channel upstream of the object; and
    valve means for adjusting the flow of fluid through the first channel and the second channel.

13. An ozone supply apparatus according to claim 12, wherein the first channel includes an ejector pump for pumping fluid through the fluid flow ejector.

14. An ozone supplying apparatus according to claim 11, wherein the growing creatures are fish.

15. An ozone supplying apparatus comprising an ozone generator for generating ozonized oxygen from raw material oxygen, an adsorption/desorption device for adsorbing and storing ozone from ozonized oxygen and desorbing the ozone connected to said ozone generator, an ozone desorbing means including a fluid flow ejector connected to said adsorption/desorption device for removing ozone therefrom, the adsorption/desorption device being connected to the ozone generator to return oxygen to the ozone generator after desorbing ozone therefrom by the adsorption/desorption device, a fluid supply means connected with and supplying fluid through the fluid flow ejector for injecting ozone into the fluid, wherein the apparatus further includes a pressure sensor for measuring a pressure in the adsorption/desorption device, an object to be treated with the fluid injected with ozone connected to the fluid supply means downstream of the fluid flow ejector, a fluid storing means connected to the object for storing fluid after being injected with ozone and after treatment of the object, a fluid treating means connected with said fluid storing means for treating fluid to remove ozone and oxide therefrom after treatment of the object, and a fluid treating channel connected to the treating means, whereby fluid released from the apparatus is treated prior to release.

16. An ozone supplying apparatus according to claim 15, wherein the fluid supply means comprises a first channel and a second channel, the first channel extending through the fluid flow ejector and joining with the second channel upstream of the object; and valve means for adjusting the flow of fluid through the first channel and the second channel.

17. An ozone supply apparatus according to claim 16, wherein the first channel includes an ejector pump for pumping fluid through the fluid flow ejector.

18. An ozone supplying apparatus comprising an ozone generator for generating ozonized oxygen from raw material oxygen, an adsorption/desorption device for adsorbing and storing ozone from ozonized oxygen connected to said ozone generator, an ozone desorbing means including a fluid flow ejector connected to said adsorption/desorption device for removing ozone therefrom, the adsorption/desorption device being connected to the ozone generator to return oxygen to the ozone generator after desorbing ozone therefrom by the adsorption/desorption device, a fluid supply means connected with and supplying fluid through the fluid flow ejector for injecting ozone into the fluid, an object to be treated with the fluid injected with ozone connected to the fluid supply means downstream of the fluid flow ejector, wherein the apparatus further includes a fluid storing means connected to the object for storing fluid after being injected with ozone and after treatment of the object, and a fluid purifying device connected to the fluid storing means for removing ozone and oxide from the fluid after treatment of the object.

19. The apparatus of claim 18, wherein the apparatus includes an ozone injecting channel which constitutes a closed loop comprising the fluid storing means, the fluid flow ejector, the fluid supply means for supplying fluid to the fluid flow ejector, and the object to be treated with fluid containing ozone therein.

20. The apparatus of claim 19, wherein the apparatus includes a switch valve for making fluid circulate in the ozone injecting channel at the time of injecting ozone.

21. The apparatus of claim 18, wherein the apparatus includes an ozone injecting channel which constitutes a closed loop comprising the object to be treated with fluid containing ozone therein between the fluid storing means and the fluid supply means for supplying fluid to the ozone desorbing means.

22. The apparatus of claim 21, wherein the apparatus includes a switch valve for making fluid circulate in the ozone injecting channel at the time of injecting ozone.

23. The apparatus of claim 18, wherein the apparatus includes a switch valve for making fluid circulate in an ozone injecting channel at the time of injecting ozone.

24. The apparatus of claim 18, wherein the apparatus includes a fluid treating channel constituting a closed loop comprising the fluid storing means, the fluid purifying device, and the fluid supply means.

25. The apparatus of claim 24, wherein the apparatus includes a switch valve for making fluid circulate in the fluid treating channel after injecting ozone.

26. An ozone supplying apparatus according to claim 18, wherein the fluid supply means comprises a first channel and a second channel, the first channel extending through the fluid flow ejector and joining with the second channel upstream of the object; and valve means for adjusting the flow of fluid through the first channel and the second channel.

27. An ozone supply apparatus according to claim 26, wherein the first channel includes an ejector pump for pumping fluid through the fluid flow ejector.

28. An ozone supplying apparatus comprising an ozone generator for generating ozonized oxygen from raw material oxygen, an adsorption/desorption device for adsorbing and storing ozone from ozonized oxygen and desorbing the ozone connected to said ozone generator, an ozone desorbing means including a fluid flow ejector connected to said adsorption/desorption device for removing ozone therefrom, the adsorption/desorption device being connected to the ozone generator to return oxygen to the ozone generator after desorbing ozone therefrom by the adsorption/desorption device, a fluid supply means connected with and supplying fluid through the fluid flow ejector for injecting ozone into the fluid, wherein the apparatus further includes a pressure sensor for measuring a pressure in the adsorption/desorption device, an object to be treated with the fluid injected with ozone connected to the fluid supply means downstream of the fluid flow ejector, a fluid storing means connected to said object for storing fluid after being injected with ozone and after treatment of the object, and a fluid purifying device connected with said fluid storing means for removing ozone and oxide from the fluid after treatment of the object.

29. An ozone supplying apparatus according to claim 28, wherein the fluid supply means comprises a first channel and a second channel, the first channel extending through the fluid flow ejector and joining with the second channel upstream of the object; and valve means for adjusting the flow of fluid through the first channel and the second channel.

30. An ozone supply apparatus according to claim 29, wherein the first channel includes an ejector pump for pumping fluid through the fluid flow ejector.

* * * * *